(12) United States Patent
Ferrazza et al.

(10) Patent No.: US 12,113,446 B2
(45) Date of Patent: Oct. 8, 2024

(54) CONTROL CIRCUIT, CORRESPONDING ELECTRONIC CONVERTER DEVICE AND METHOD OF OPERATING THEREOF

(71) Applicant: STMicroelectronics S.r.l., Agrate Brianza (IT)

(72) Inventors: Francesco Ferrazza, Milan (IT); Mirko Gravati, Milan (IT); Christian Leone Santoro, San Giuliano Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 391 days.

(21) Appl. No.: 17/698,786

(22) Filed: Mar. 18, 2022

(65) Prior Publication Data

US 2022/0311341 A1 Sep. 29, 2022

(30) Foreign Application Priority Data

Mar. 29, 2021 (IT) .................... 102021000007628

(51) Int. Cl.
*H02M 3/335* (2006.01)
*H02M 1/08* (2006.01)
*H02M 1/32* (2007.01)

(52) U.S. Cl.
CPC ............ *H02M 3/335* (2013.01); *H02M 1/08* (2013.01); *H02M 1/32* (2013.01)

(58) Field of Classification Search
CPC .......... H02M 3/335; H02M 1/08; H02M 1/32; H02M 1/0012; H02M 1/0022
See application file for complete search history.

(56) References Cited

U.S. PATENT DOCUMENTS

| 9,621,029 | B2* | 4/2017 | Gritti | ................. H02M 1/4258 |
| 9,853,573 | B2 | 12/2017 | Siri | |
| 2008/0315852 | A1 | 12/2008 | Jayaraman et al. | |
| 2022/0311329 | A1* | 9/2022 | Santoro | ............... H02M 1/0022 |

OTHER PUBLICATIONS

Adragna, C., "Design Equations of High-Power-Factor Flyback Converters Based on the L6561," STMicroelectronics, AN1059 Application Note, Sep. 2003, pp. 1-20.
Wuidart, L., "Topologies for Switched Mode Power Supplies," STMicroelectronics, ANL513/0393 Application Note, 1999, pp. 1-18.

* cited by examiner

*Primary Examiner* — Kyle J Moody
(74) *Attorney, Agent, or Firm* — Seed IP Law Group LLP

(57) ABSTRACT

A control circuit for controlling a switching stage of an electronic converter includes a first terminal configured to provide a drive signal and a second terminal configured to receive a first feedback signal. A third terminal receives a second feedback signal and a driver circuit provides the drive signal as a function of a PWM signal. A PWM signal generator circuit generates the PWM signal as a function of the first feedback signal, a reference threshold and the second feedback signal or a slope compensation signal. The control circuit is configured to sense an input signal, provide a first compensation parameter, and provide a first compensating signal as a function of a power of the input sensing signal.

20 Claims, 6 Drawing Sheets

FIG. 2
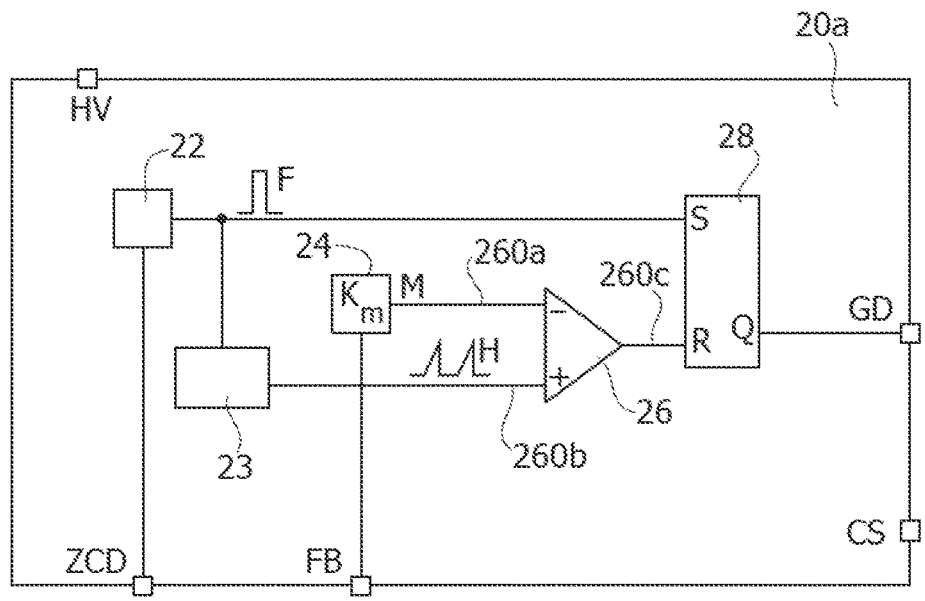
FIG. 3
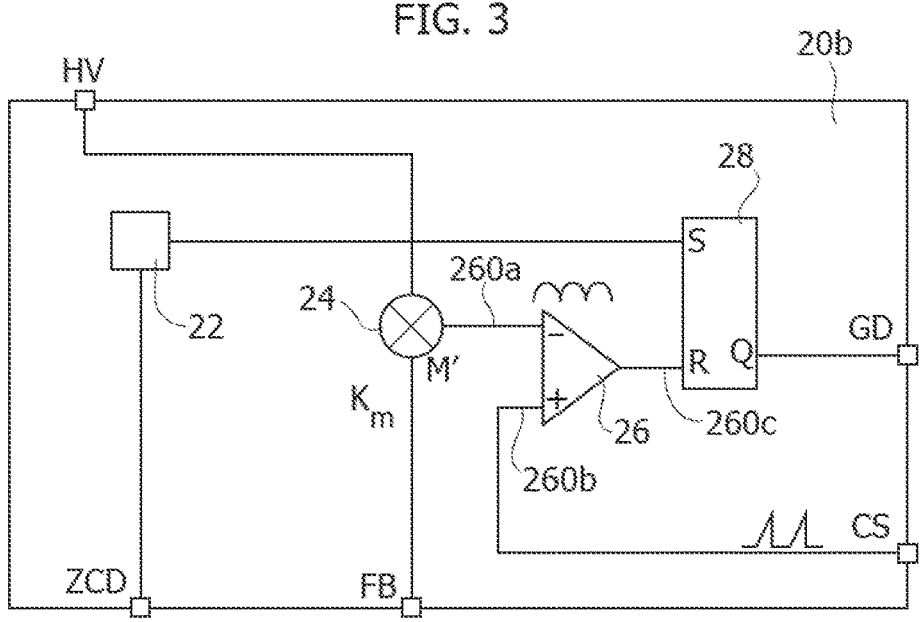
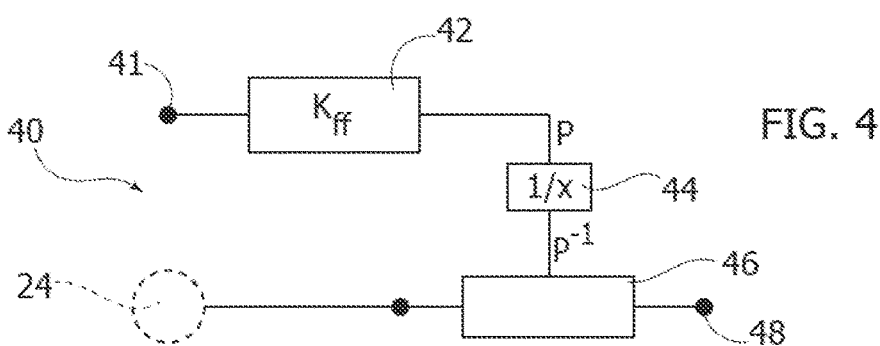
FIG. 4

CONTROL CIRCUIT, CORRESPONDING ELECTRONIC CONVERTER DEVICE AND METHOD OF OPERATING THEREOF

BACKGROUND

Technical Field

The description relates to electronic converter circuits having a variety of circuit topologies, such as flyback or buck-boost topologies, for instance.

One or more embodiments may be suitable to adjust an output voltage of the converter circuit in a wide range of values. For instance, this may be the case in a set of applications envisaging an ample variability of values of electrical loads to which power supply is provided.

Description of the Related Art

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck," "boost," "buck-boost," "auk," "SEPIC," and "ZETA" type. Instead, isolated converters are, for instance, converters of the "flyback," "forward," "half-bridge," and "full-bridge" type. Such types of converters are well known to the person skilled in the art, as evidenced, e.g., by the application note AN513/0393 "Topologies for Switched Mode Power Supplies," L. Wuidart, 1999, STMicroelectronics.

Different DC-DC converter topologies may be selected as a function of the specific field of application. Some fields of application such as LED control gear and smart charging (e.g., as in the USB-PD protocol), can present a wide variation of the output voltage regulation, as the electrical load has an inherent variability.

Flyback and buck-boost types can be suited in such application scenarios as they absorb energy from the input voltage and transfer it to the load, e.g., via a transformer.

Depending on the application, again, in order to provide adequate efficiency and performance levels, the converter circuit can be operated in different modes (e.g., Continuous-Conduction Mode—CCM, Discontinuous-Conduction Mode—DCM, asynchronous mode, synchronous mode, etc.) and to operate reliably in different scenarios. In such conditions, the design of a DC-DC converter is rather complicate, in particular with regards to power quality and maximum power delivery figures of merit.

During a possible overload condition, the flyback topologies can show a range of variations of:

maximum input power, as it depends on input voltage amplitude, waveform shape and output voltage; and
input current distortions when variable input voltages are applied.

Various applications may involve safety arrangements such as galvanic insulation and input power limitation, for instance. The latter may be dedicated to preventing from excessive overheating, countering risks of failures and, eventually, burning with smoke and gas emission.

Existing solutions for limiting a maximum input power in flyback converters can show one or more of the following drawbacks:

limiting the input power takes into account waveform shape of input voltage and of peak current, the latter changing with overload;
difficult compensation of peak current waveform as it can change with overload,
lack of non-empirical equalization methods;
solutions can be effective for one input waveform shape only and for a unique configuration of the output having a predictable duty cycle;
different power limits depending on input voltage shape or output voltage variations.

BRIEF SUMMARY

One or more embodiments contribute in overcoming the aforementioned drawbacks.

According to one or more embodiments, technical benefits can be achieved by means of a control circuit having the features set forth herein.

A control circuit comprising processing circuitry configured to limit the input power of a power converter, e.g., controlling power absorption during overload of the electronic converter, may be exemplary of such a circuit.

One or more embodiments may relate to a corresponding electronic converter device. A flyback or buck-boost electronic converter may be exemplary of such a device.

One or more embodiments can relate to methods of obtaining a high power-factor, HPF, and low input current distortion (THDi) in electronic converters.

One or more embodiments may render absorption of power from line constant or uniform during both normal and overload condition, countering stresses on the board.

One or more embodiments may facilitate harmonizing opposing performance demands, facilitating meeting high standards regarding both power quality and about maximum power delivery.

One or more embodiments facilitate providing a maximum power limitation level which is constant, that is independent from other parameters such as, e.g., input/output voltage amplitude or shape and transformer design.

One or more embodiments may provide an adequate power quality, close to best class, also during max power limitation.

One or more embodiments may facilitate obtaining an input power limitation that is independent from input voltage amplitude, input voltage shape and operating duty cycle.

One or more embodiments may be applied to HPF flyback or buck-boost topologies and to different control schemes thereof.

One or more embodiments may use a dedicated circuit block for detecting a waveform of input voltage and/or to adapt output levels in view of a detected source-type.

One or more embodiments may be used in conjunction with a microcontroller, facilitating real time integral calculation.

BRIEF DESCRIPTION OF THE SEVERAL VIEWS OF THE DRAWINGS

One or more embodiments will now be described, by way of non-limiting example only, with reference to the annexed Figures, wherein:

FIGS. 2 and 3 are exemplary diagrams of a control circuit block for the electronic converter of FIG. 1, FIG. 4 is an exemplary circuit diagram configured for limiting input power levels of the electronic converter of FIG. 1, FIGS. 5 to 8 are exemplary diagrams of a control circuit as per the present disclosure.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

Throughout the figures annexed herein, like parts or elements are indicated with like references/numerals and a corresponding description will not be repeated for brevity. The references used herein are provided merely for convenience and hence do not define the extent of protection or the scope of the embodiments.

For the sake of simplicity, identical designations may be used herein for designating both certain circuit nodes and signals occurring at those nodes.

Figure 1:
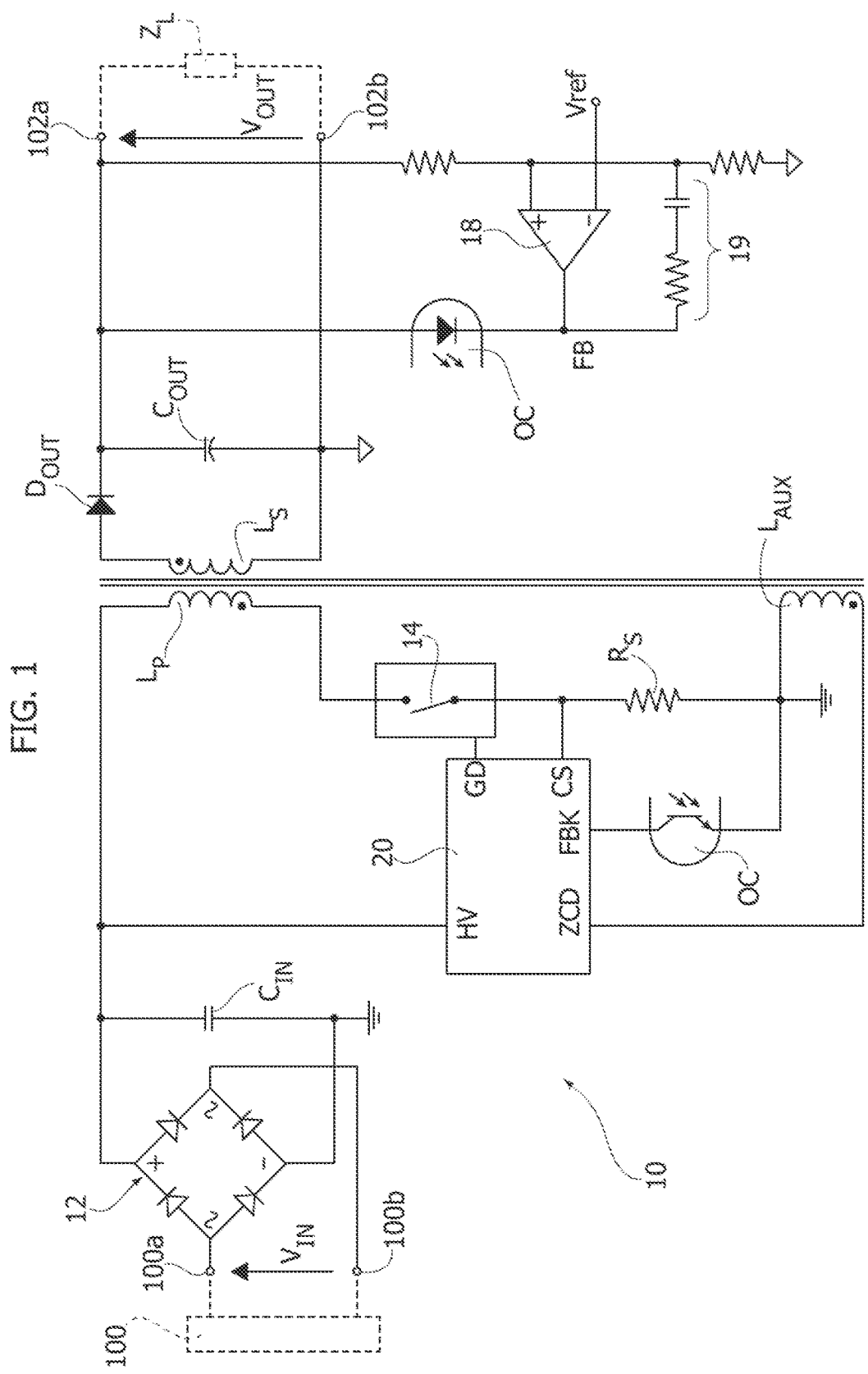
FIG. 1 is an exemplary circuit diagram of an electronic converter.

FIG. 1 shows an electronic converter 10 having a conventional flyback topology, the converter 10 comprising:
input nodes 100a, 100b configured to be coupled to a (main) source 100 of alternate-current (AC) electrical energy to receive an input signal therefrom $V_{IN}$;
output nodes 102a, 102b configured to be coupled to a load $Z_L$ to provide an output signal $V_{OUT}$ thereto,
a rectifier bridge 12 coupled to the input nodes 100a, 100b and configured to rectify the input signal $V_{IN}$, providing a rectified signal as an output;
a transformer $L_P$, $L_S$ with a primary side coupled to at least one input node 100a and a secondary side coupled to the output nodes 102a, 102b, the transformer $L_P$, $L_S$ having a first inductance $L_P$, with a first number of turns, on the primary side and a second inductance $L_S$, with a second number of turns, on the secondary side, where a ratio between the first number of turns and the second number of turns is equal to n; a magnetic core of the transformer $L_S$, $L_P$ stores energy from primary side and releases it to the secondary side;
a controlled switch 14, e.g., a transistor made in any known semiconductor technology, coupled to the transformer $L_S$, $L_P$, the switch 14 configured to switch between a first and a second state based on a control signal GD apply at a control terminal thereof, the switch 14 configured to activate accumulation of energy from the main source 100 on the primary inductance $L_P$ of the transformer $L_P$, $L_S$ when in the first, e.g., ON, state and to deactivate such an accumulation when in the second, e.g., OFF, state; the switching has full period T in which an energy storage phase lasts for a time interval $T_{ON}$, referring to the corresponding "ON" state of the switch 14, e.g., $T=T_{ON}+T_{OFF}$;
a rectifier $D_{OUT}$, such as a diode or an active structure (e.g., a synchronous rectifier), coupled to the second inductance $L_S$ and to the output nodes 102a, 102b, the rectifier $D_{OUT}$ configured to become active during the release of the energy to the secondary side and to be inhibited during the energy storage phase $T_{ON}$ on the primary side of the transformer $L_P$, $L_S$;
an output capacitor $C_{OUT}$ coupled to the rectifier $D_{OUT}$ and to the output nodes 102a, 102b, the capacitor $C_{OUT}$ configured to filter the switching activity of the switch 14 to provide a continuous voltage (or current) $V_{OUT}$ on the load $Z_L$;
an error amplifier 18 coupled to the rectifier $D_{OUT}$ and the output nodes $V_{OUT}$, the error amplifier 18 configured to measure an output value (e.g., voltage or current) and to compare it with a reference value $V_{REF}$, providing as a result an error signal FB to a controller circuit 20; the error amplifier 18 may be coupled to a compensation network 19, e.g., an RC network, configured to compensates the loop response to improve stability and bandwidth;
a control circuit 20 comprising a plurality of input/output terminals or nodes HV, ZCD, FB, CS, GD.

Specifically, the control circuit 20 as exemplified in FIG. 1 comprises:
a first input node HV coupled to the rectifier bridge 12 to receive therefrom a first signal HV indicative of the input signal $V_{IN}$; for instance, the first signal HV can be a rectified sinusoid waveform where the peak value of such a waveform is a function of the RMS input voltage $V_{RMS}$, namely $V_{pk}=\sqrt{2}*V_{RMS}$;
a second input node ZCD coupled to the transformer $L_S$, $L_P$ and configured to receive a second signal ZCD to perform timing of operations, as discussed in the following;
a third input node CS configured to receive a third signal CS indicative of a switching activity of the converter circuit 10, e.g., indicative of a current flowing through the first inductance $L_P$ of the primary side of the transformer $L_P$, $L_S$;
a feedback node FB coupled the error amplifier 18 (e.g., via an optocoupler OC, in a manner per se known) of the secondary side to receive an error/feedback signal FB therefrom,
an output node GD configured to control the switch 14 via one or more control signals GD applied thereto.

An electronic converter 10 of the buck-boost or flyback kind, can be operated in a discontinuous mode called "boundary mode." In this operating mode, the converter 10 can provide a power factor close to unity when supplied with an input signal, e.g., a sinewave.

As exemplified in FIG. 1, the converter 10 may comprise an auxiliary winding $L_{AUX}$ coupled with the transformer $L_S$, $L_P$ and configured to detect an occurrence of a zero current into the rectifier $D_{OUT}$, providing as a result the second signal ZCD at a respective node of the control circuit 20. In boundary mode, the control circuit 20 can use the second signal ZCD as a synchronization signal to drive the switch 14 to change state concurrently with sensing $L_{AUX}$ zeroing of the current into the rectifier $D_{OUT}$.

As exemplified in FIG. 1, a shunt resistor $R_S$ is coupled in series to the switch 14 and coupled to the control circuit 20, the resistor $R_S$ configured to read a current CS flowing in the switch 14 and to provide the third signal to the respective node CS of the control circuit 20.

An input power Pin for the circuit as exemplified in FIG. 1 can be expressed as:

$$P_{IN}(t) = \frac{1}{2} \cdot L_P \cdot I_{PK}(t)^2 \cdot fsw(t)$$

where
$L_P$ is the first inductance of the primary side of the transformer $L_P$, $L_S$,
$I_{PK}$ is a peak switch current sensed by $R_S$,
fsw is the operating frequency, that is fsw=1/T(t),
An energy balance condition for the circuit as exemplified in FIG. 1 can be expressed as:

$$V_{IN}(t) \cdot T\_ON(t) = n \cdot V_{OUT} \cdot T\_OFF(t)$$

where:
$V_{IN}(t)$ is the input voltage as a function of time,
$T_{ON}(t)$ is the ON-state duration of the switch 14 as a function of time,
n is the turn ratio of the transformer $L_P$, $L_S$,
$T_{OFF}(t)$ is the OFF-state duration of the switch 14 as a function of time.

Taking into account the definition of inductance and that of duty cycle δ, the input power Pin can be expressed also as:

$$P_{IN}(t) = \frac{1}{2} \cdot V_{IN} \cdot I_{PK}(t) \cdot \delta(t) \text{ where}$$

$$\delta(t) = \frac{T_{ON}(t)}{T(t)} = \frac{1}{1 + \frac{V_{IN}(t)}{n \cdot V_{OUT}}}$$

is the duty cycle as a function of time.

For the sake of simplicity, one or more embodiments are discussed in the following mainly with respect to the flyback circuit topology, being otherwise understood that such a topology is purely exemplary and in no way limiting. One or more embodiments may be suitable for notionally any high power-factor converter circuit. In particular, a buck-boost circuit topology can be suitable as it can be modelled as a flyback converter with a lossless transformer having unitary turn ratio.

A converter circuit as exemplified in FIG. 1 equipped with a control circuit 20 in the first 20a or second 20b configuration has a peak current $I_{PK}(t)$ that can be expressed as a scaled replica of $V_{IN}(t)$. Taking this into account, the input power may be expressed as:

$$P_{IN}(t) = \frac{1}{2} \cdot V_{INmax} \cdot I_{PKmax} \cdot \Gamma(t)^2 \cdot \delta(t)$$

where:
Γ(t) is a general waveform function indicative of a waveform type (e.g., sinusoid, triangle, trapezoid or DC) of evolution of the input voltage/current over time,
pedis "max" indicated the maximum value of the respective parameter.

Assuming that the general waveform function Γ(t) is periodical with a waveform period $T_{IN}$, an average input power $\overline{P_{IN}}$ can be expressed as:

$$\overline{P_{IN}} = \frac{1}{2} \cdot V_{INmax} \cdot I_{PKmax} \cdot \int_0^{T_{IN}} \Gamma(t)^2 \cdot \frac{1}{1 + \frac{V_{INmax} \cdot \Gamma(t)}{V_R}} dt$$

As appreciable from the equation above, limiting the input power may be challenging as it is based on the evolution over time of the waveform function Γ(t).

FIGS. 2 and 3 are diagrams exemplary of conventional configurations of the control circuit block 20, where:
FIG. 2 is an exemplary diagram of a voltage control mode (VCM) configuration 20a of the control circuit 20, wherein determining a duration $T_{ON}$ of the energy storage period is based on the error signal FB from the error amplifier 18, and
FIG. 3 is an exemplary diagram of a peak current mode (PCM) configuration 20b of the control circuit 20, wherein determining the energy storage period $T_{ON}$ is based on the current signal CS sensed by the shunt resistor $R_S$ reaching a certain threshold value M', e.g., based on the error signal FB from the error amplifier 18.

As exemplified in FIG. 2, the control circuit in the VCM configuration 20a comprises:
a logic circuit block 22 coupled to the second input node ZCD and configured to receive the detection signal ZCD therefrom to provide a first signal F (e.g., a square signal),
a ramp generator circuit block 23 coupled to the logic circuit block 22 and configured to provide a ramp signal H based on the first driving signal F (e.g., a sawtooth signal obtained by integrating the first signal F),
a scaling circuit block 24 coupled to the feedback node FB to receive the error signal FB therefrom and configured to provide a threshold value M (e.g., the error signal FB multiplied by, that is added to itself a number of times equal to, a scaling factor Km),
a comparator circuit block 26 having an inverting input node 260a coupled to the scaling circuit 24 to receive the threshold value M therefrom, a non-inverting input node 260b coupled to the ramp generator circuit block 23 to receive the ramp signal H therefrom and an output node 260c to provide an output signal based on the threshold value M and the ramp signal R received,
a memory circuit block 28, e.g., a flip-flop, coupled to the logic circuit block 22 to receive the first signal F therefrom and to the output node 260c of the comparator circuit block 26 to receive the output signal therefrom, the memory circuit block 28 coupled to the output node GD and configured to provide the control signal GD thereto.

As exemplified in FIG. 3, the control circuit with the PCM configuration 20b in differs from the VCM configuration thereof 20a in FIG. 2 in that:
the scaling circuit block 24 is further coupled to the input node HV and is configured to provide the threshold value M' (e.g., as the product of the error signal FB and the input signal HV scaled by scaling factor Km) to the inverting input node 260a of the comparator circuit 26;
the ramp generator circuit block 23 is absent as the ramp signal H is replaced by the signal CS at the third input node CS; such signal CS can be expressed as $R_S * I_{PK}(t)$;
the non-inverting input node 260b of the comparator circuit block 26 is coupled to the third input node CS to receive therefrom the current signal CS sensed by the shunt resistor $R_S$.

FIG. 4 is a diagram exemplary of a conventional power limiting circuit block 40 configured to limit the input power $P_{IN}$ which can be integrated into the control circuit 20, both in the VCM 20*a* and PCM 20*b* configuration thereof.

As exemplified in FIG. 4, the power limiting circuit 40 comprises:

- an input node 41 configured to be coupled to the input voltage node HV of the control circuit 20,
- a peak detector circuit block 42 having a (e.g., adjustable) gain Kff and a holding time interval $T_{HOLD}$, e.g., $T_{HOLD} \gg T_{IN}$, the peak detector configured to detect a peak value P of the input voltage HV (e.g., P=Kff*max ($V_{IN}$)),
- a divider circuit block 44 configured to receive the detected peak value P and to compute an inverse $P^{-1}$ thereof,
- a regulator circuit block 46 configured to adjust the maximum (power) level, e.g., automatically, on the basis of the computed inverse $P^{-1}$ of the detected peak value P, in a way per se known.

For instance, the output node 48 of the power limiting circuit block 40 is coupled to the inverting node 260*a* for the VCM 20*a* or the PCM 20*b* configuration of the control circuit 20, where the power limitation is applied to the feedback signal FB in the first case 20*a* and to the third signal CS in the second case 20*b*;

For instance, the output node 48 of the power limiting circuit block 40 is coupled to the error signal node FB for the PCM configuration 20*b* of the control circuit 20, where the power limitation is applied to the feedback signal FB.

A power limiting arrangement 40 as exemplified in FIG. 4 may present some drawbacks, including:

- when the controller 20 is in the PCM configuration 20*b* and the output node 48 of the power limiting circuit block 40 is coupled to the inverting node 260*a* of the amplifier comparator circuit block 26, the power limitation may limit the switch current level $I_{PK}(t)$ of the sensed current CS, leading to introducing an appreciable distortion of the input current which causes the assumption that input current and input voltage $V_{IN}$ share a same waveform $\Gamma(t)$ to be no longer valid;
- a conventional compensation of the applied limitation introduced, for instance starting from the peak of the input voltage $V_{IN}$, is empirical and complex to equalize;
- when the controller is in the VCM configuration 20*a* and the output node 48 of the power limiting circuit block 40 is coupled either to the inverting node 260*a* of the amplifier 260 either to the feedback node FB, the loop response can be appreciably slower than time interval $T_{IN}$; as a result, while the waveform of the peak current $I_{PK}(t)$ maintains a same waveform function $\Gamma(t)$ as that of the input voltage $V_{IN}$, its power limiting varies undesirably based on input voltage waveform or output voltage variations.

Figure 5:
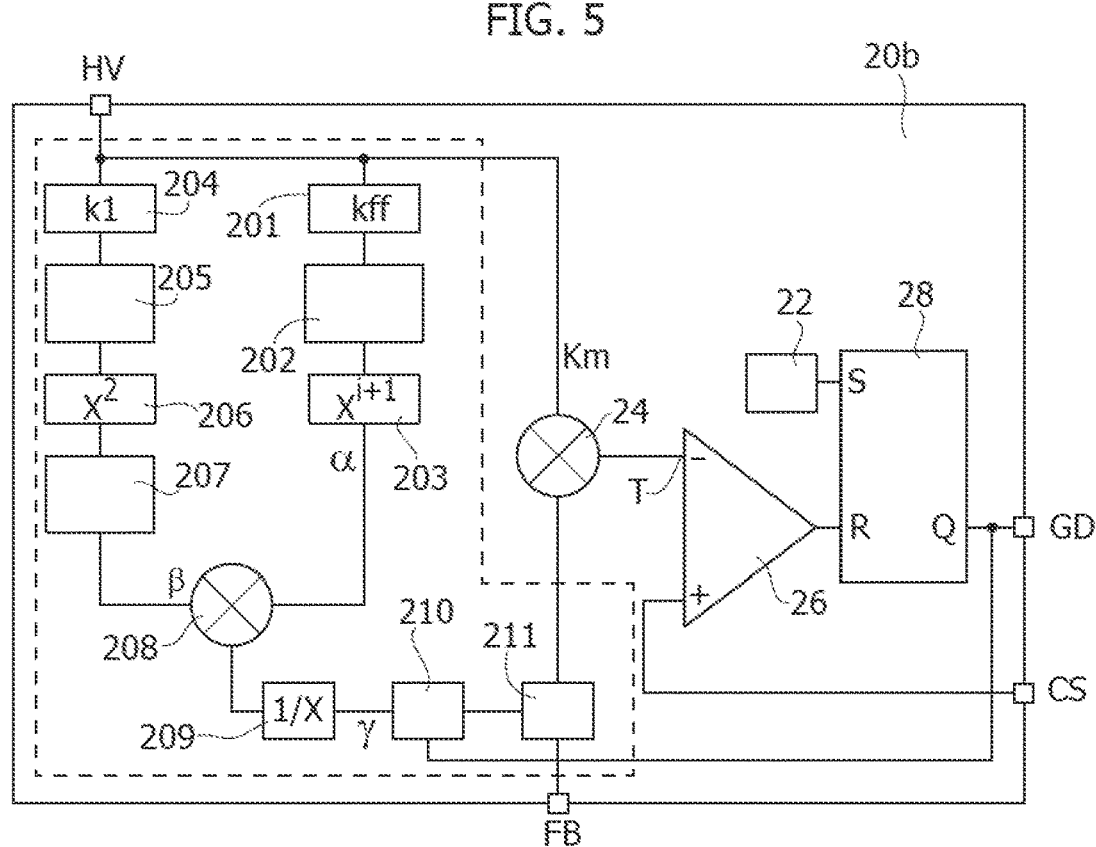
Figure 6:
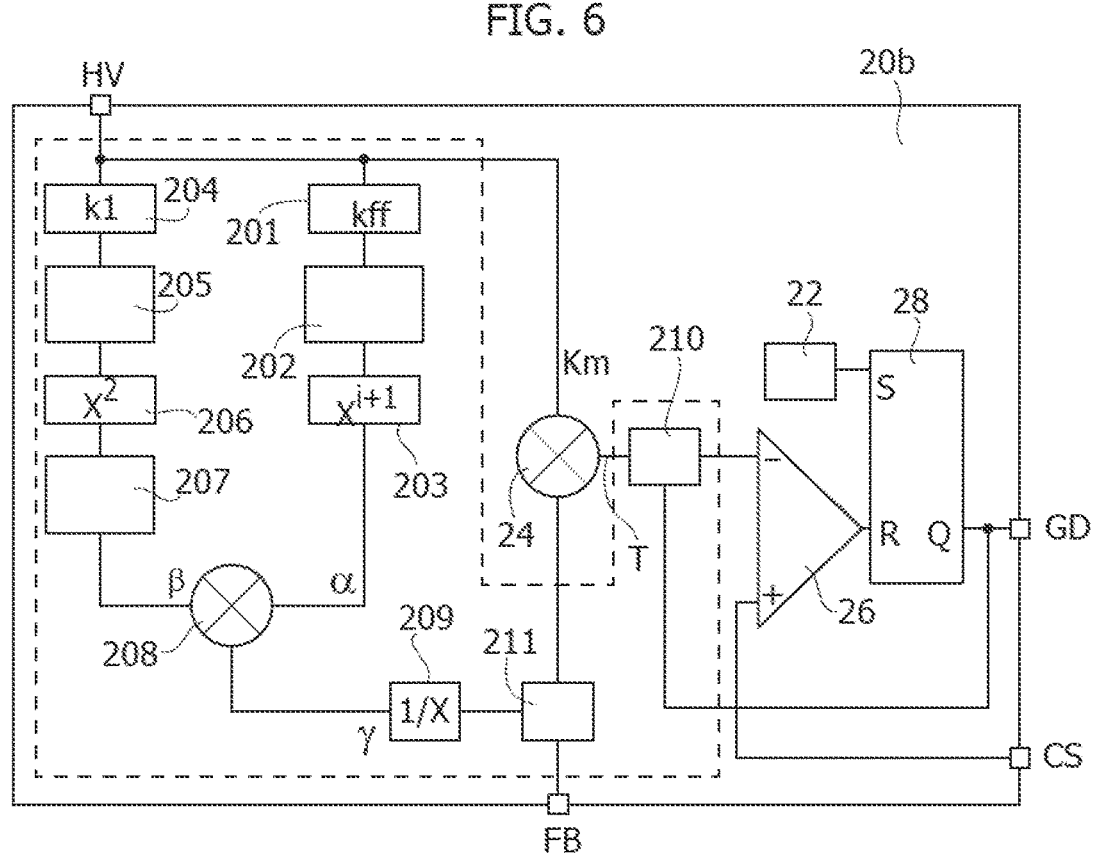

One or more embodiments as exemplified in FIGS. 5 and 6 may overcome the aforementioned drawbacks.

For the sake of simplicity, one or more embodiments are discussed below mainly with respect to an improved solution for a PCM control circuit configuration 20*b*, being otherwise understood that one or more embodiments may apply, mutatis mutandis, to VCM configured control circuits 20*a*.

One or more embodiments may exploit limiting a power level independently of input voltage shape (pr waveform), input voltage amplitude and operating duty cycle. This may be based on the observations that the factors involved in the expression of the maximum input power $P_{INmax}$ may be recast so that:

- input voltage HV may be expressed as the product of the maximum input voltage $V_{INmax}$ (optionally, an i-th power thereof) times the form factor $\Gamma(t)$,
- the threshold value M' can be expressed as the product of input voltage HV, the error signal FB and the scaling factor Km,
- the peak current $I_{PK}(t)$ is expressed as ratio of the threshold value M' and the current sense resistance $R_S$.

As a result, the peak current $I_{PK}(t)$ expression becomes:

$$I_{PK}(t) = \frac{M'}{R_S} = K_m \cdot V_{INmax}^i \cdot \Gamma(t) \cdot V_{FB} = I_{PKmax}\Gamma(t)$$

From this expression, it is possible to obtain an expression for $I_{PKmax}$ which may be used to recast the average maximum input power $P_{INmax}$ as:

$$P_{INmax} = \frac{1}{2} \cdot (V_{INmax})^{i+1} \cdot \frac{K_m \cdot V_{FB}}{R_S} \cdot \int_0^{T_{IN}} \Gamma(t)^2 \cdot \delta(t) dt P_{INmax} \text{ where}$$

$(V_{INmax})^\wedge$ is a maximum value of the input voltage $V_{IN}$ (optionally scaled by a factor Kff which may be customized) and raised to the (i+1)-th power;

$\int_0^{T_{IN}} \Gamma(t)^2 \cdot \delta(t) dt$ is an integral over waveform period $T_{IN}$ of the square of input waveform $\Gamma(t)$ times duty cycle $\delta(t)$.

In one or more embodiments as exemplified in FIGS. 5 and 6, the control circuit 20 may be modified so as to implement a method of compensating "variable" factors and to provide a "constant", controllable value for the maximum input power $P_{INmax}$, as discussed in the following.

As exemplified in FIG. 5, the control circuit 20 in the PCM configuration 20*b* may comprise:

- a first compensating stage 201, 202, 203 coupled to the input node HV to receive the input signal HV therefrom, the first compensating stage 201, 202, 203 configured to provide a first compensating signal $\alpha$ based on the input signal HV, e.g., $\alpha = K_{ff} \cdot (V_{INmax})^{i+1}$;
- a second compensating stage 204, 205, 206, 207 coupled to the input node HV to receive the input signal HV therefrom, the second compensating stage 204, 205, 206, 207 configured to provide a second compensating signal $\beta$ based on the input signal HV, e.g., $\beta = k1 \cdot \int_0^{T_{IN}} \Gamma(t)^2 dt$;
- a third compensating stage 208, 209 coupled to the first compensating stage 201, 202, 203 to receive the first compensating signal $\alpha$ therefrom and to the second compensating stage 204, 205, 206, 207 to receive the second compensating signal $\beta$ therefrom, the third compensating stage configured to provide a third compensating signal $\gamma$ as the inverse of the product of the first compensating signal $\alpha$ times the second compensating signal $\beta$, e.g., $$\gamma = \frac{1}{\alpha \cdot \beta} = \frac{1}{K_{ff} \cdot (V_{INmax})^{i+1} k1 \cdot \int_0^{T_{IN}} \Gamma(t)^2 dt};$$

the third compensating signal γ represents the upper limit for the error signal FB;

a fourth compensating stage 210 coupled to the memory circuit block 28 to receive the output signal GD therefrom and to apply duty cycle modulation based on the output signal GD to an input signal, e.g., third compensating signal γ;

a regulator circuit block 211 (which may use the regulator circuit block 46 of FIG. 4) coupled to the error node FB, to the scaling circuit block 24 and to the third compensating stage 208, 209, the regulator circuit block 46 configured to adjust the maximum (power) level, e.g., automatically, in a way per se known (e.g., feed-forward).

As exemplified in FIGS. 5 and 6, the scaling circuit block 24 may compute a product of the input voltage HV times the scaling factor Km times the third compensating signal γ, yielding a power threshold value T which may be expressed as $$T = \frac{1}{2} \cdot (V_{INmax})^{i+1} \cdot \frac{K_m \cdot V_{FBmax}}{R_S} \cdot$$

$$\frac{1}{K_{ff} \cdot (V_{INmax})^{i+1}} \int_0^{T_{IN}} \Gamma(t)^2 \cdot \frac{\delta(t)}{\delta(t)} dt \cdot \frac{1}{\int_0^{T_{IN}} \Gamma(t)^2 dt} = \frac{K_m \cdot V_{FBmax}}{2 \cdot K_{ff} \cdot R_S}$$

where $V_{FBamx}$ is a maximum value of the feedback signal FB.

Thus, one or more embodiments provide a method of generating a limit value for the threshold T at the input node of the error amplifier 26.

FIG. 6 shows, with respect to FIG. 5, an alternative embodiment wherein the fourth compensating stage 210 may apply duty cycle modulation to the power threshold value T as input signal in place of the third compensating signal γ.

As exemplified in FIGS. 5 and 6, the first compensating stage 201, 202, 203 may comprise:

a peak detector circuit block 201, 202 (which may correspond to the peak detector circuit block 42 of FIG. 4) having an adjustable gain block 201 (e.g., a programmable register or a voltage divider) configured to provide a gain value Kff and a holding time interval $T_{HOLD}$, e.g., $T_{HOLD} \gg T_{IN}$, the peak detector configured to detect a peak value P of the input voltage HV (e.g., P=Kff*max($V_{IN}$)), a power calculator circuit block 203 configured to elevate to the power (i+1) the detected peak value.

Figure 9:
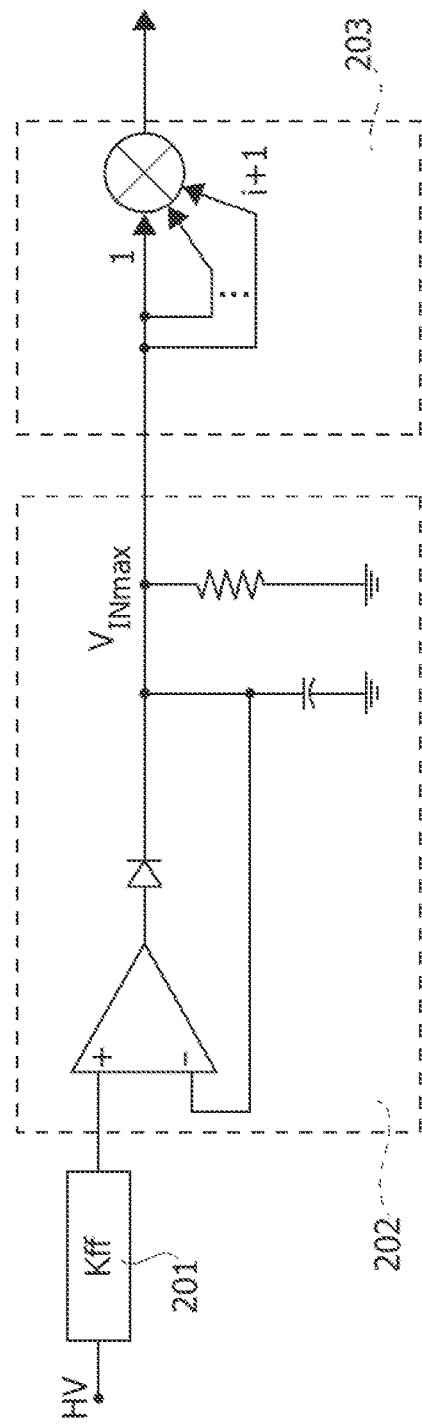
FIGS. 9 to 12 are exemplary diagrams of possible implementations of circuit blocks of FIGS. 5 to 8.

FIG. 9 shows a circuit diagram of a further possible embodiment of the first compensating stage 201, 202, 203. As exemplified in FIG. 9, the first compensating stage 201, 202, 203 may comprise:

the peak detector circuit block 201, 202 comprising a (resistive) voltage divider 201 providing Kff and comprising an operation amplifier coupled to a diode coupled to a capacitor to provide the maximum input value $V_{INmax}$ of the input signal HV, a multiplier circuit block 203 having a quantity (i+1) of input nodes coupled to the output of the peak detector circuit block 201, 202, the multiplier circuit block 203 configured to provide the maximum input value $V_{INmax}$ elevated to the power (i+1), with i being an integer which may be selected based on the application of the electronic converter circuit 10.

In one or more embodiments, the peak detector 201, 202 may also be implemented using an ideal diode coupled to an ADC and a memory circuit block to store the digital value of the VINmax, for instance an ADC converter and a logic that finds and stores the maximum value from the data collected by ADC.

As exemplified in FIGS. 5 and 6, the second compensating stage 204, 205, 206, 207 may comprise:

a level adjusting circuit block 204, e.g., a resistive voltage divider, a normalization processing circuit block 204, 205 configured to apply normalization processing to the input signal HV, providing a normalized signal having the waveform Γ(t) equal to that of the input signal Hv and having unitary (maximum) amplitude, a power calculator circuit block 206 (e.g., a multiplier circuit block) configured to provide the square power of the normalized signal that squares the waveform, e.g., $\Gamma^2(t)$, an integrator circuit block 207 (e.g., a low pass filter) configured to provide the integral of the square of the waveform Γ(t) over time interval $T_{IN}$, e.g., $\int_0^{T_{IN}} \Gamma(t)^2 d$.

Figure 10:
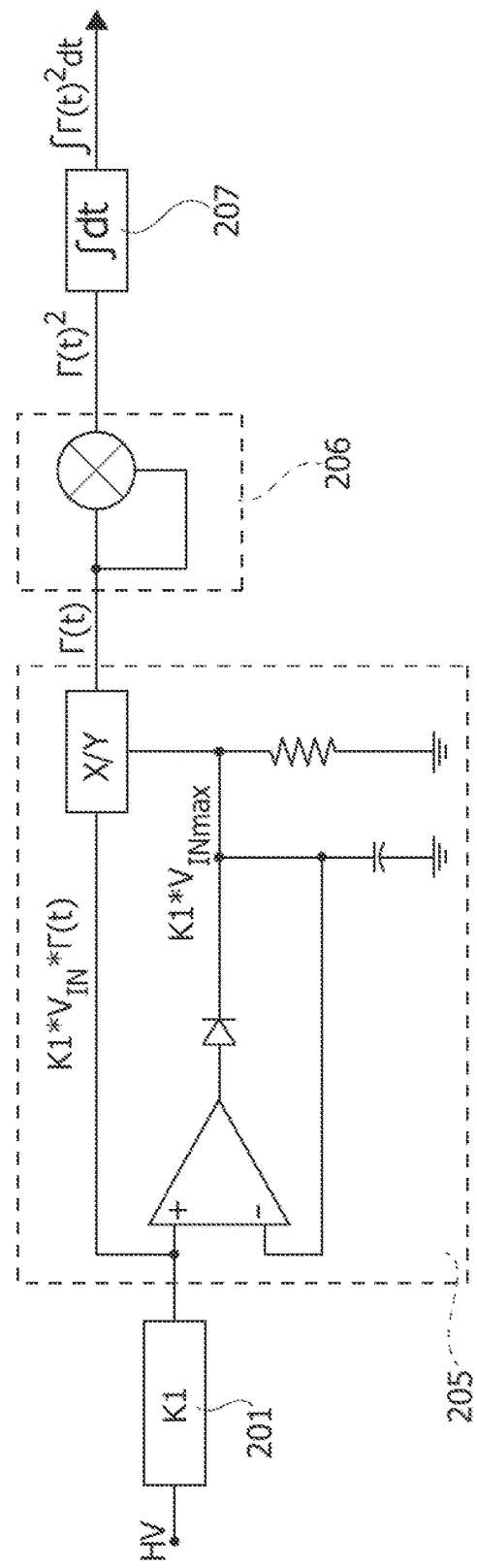

FIG. 10 shows an embodiment of the second compensating stage 204, 205, 206, 207 wherein a real-time calculation of the integral of the square of the waveform Γ(t) is performed.

Figure 11:
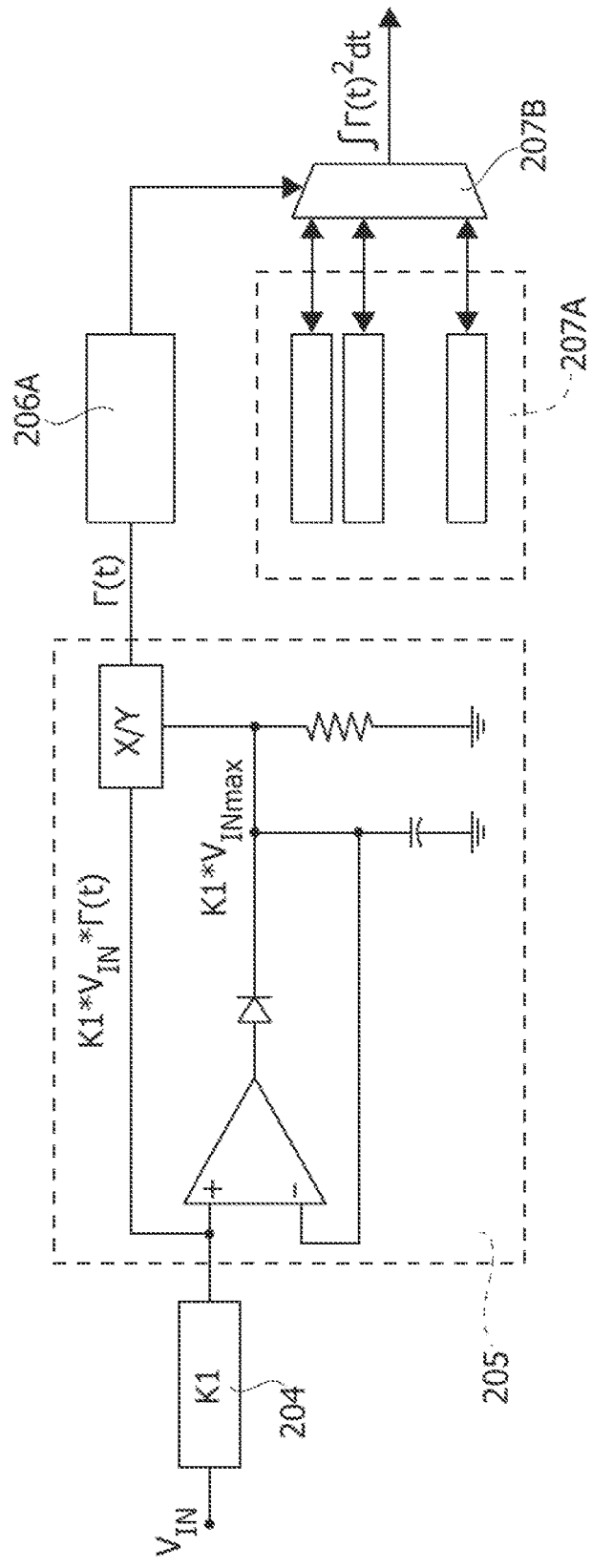

An alternative way to obtain the value of the integral of the square of the waveform Γ(t) over time interval $T_{IN}$ may comprise, as exemplified in FIG. 11:

pre-computing a set of integral values and storing them in in a look-up table (LUT) having a plurality of memory registers 207A as entries, detecting 206A a "shape" of the waveform Γ(t) of the normalized signal, and selecting 207B (e.g., via a digital multiplexer or an analogic selector) a value among pre-computed ones in a look-up table entries 207A corresponding to the detected waveform shape.

For instance, detecting 206A the shape of the waveform Γ(t) of the normalized signal may use a shape observer circuit block 206A configured to compare some pre-defined parameters of the normalized signal (e.g., ratio between peak and average value, periodical threshold crossings or absence of threshold crossings, time period between different levels crossing), where each pre-defined parameter value is associated with an entry of the stored LUT of integral values 207A.

As exemplified in FIGS. 5 and 6, the third compensating stage 208, 209 comprises a multiplier circuit block 208 and an inverter circuit block 209.

In one or more embodiments, when using a control circuit 20 in the PCM configuration 20b, the scaling circuit block 24 may be configured to perform operations of the third compensating stage 208, 209, advantageously reducing the area footprint of the circuit.

Figure 12:
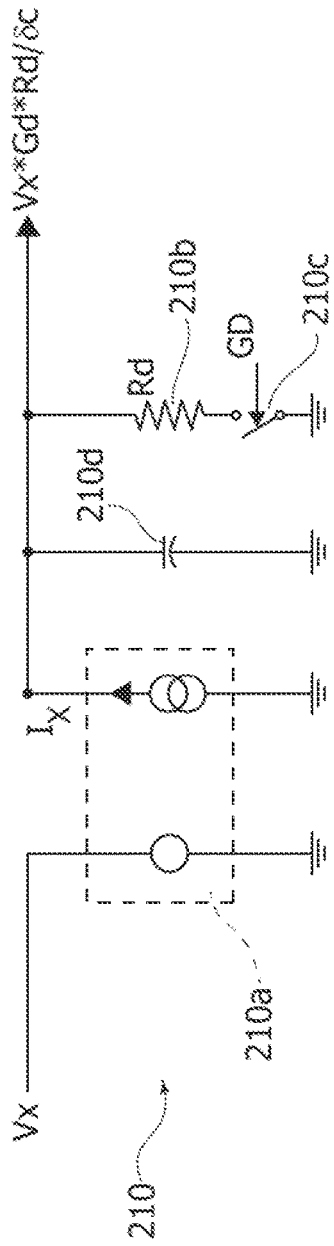

FIG. 12 shows a circuit diagram exemplary of the fourth compensating circuit block 210 as exemplified in FIGS. 5 and 6.

As exemplified in FIG. 12, the fourth compensating stage 210 comprises:

a current converter circuit block 210a configured to receive the input signal Vx and to convert it to an electrical current signal Ix, a resistive branch 210b comprising a resistance Rd coupled to a switch 210c connected to a reference potential (e.g., ground), the switch 210c configured to be driven by the output signal GD provided from the memory block 28, providing duty cycle modulation as a result, a capacitive branch 210*d* connected in parallel to the resistive branch 210*b* to provide an average voltage output signal, e.g., (Vx/δc)*Gd*Rd.

Figure 7:
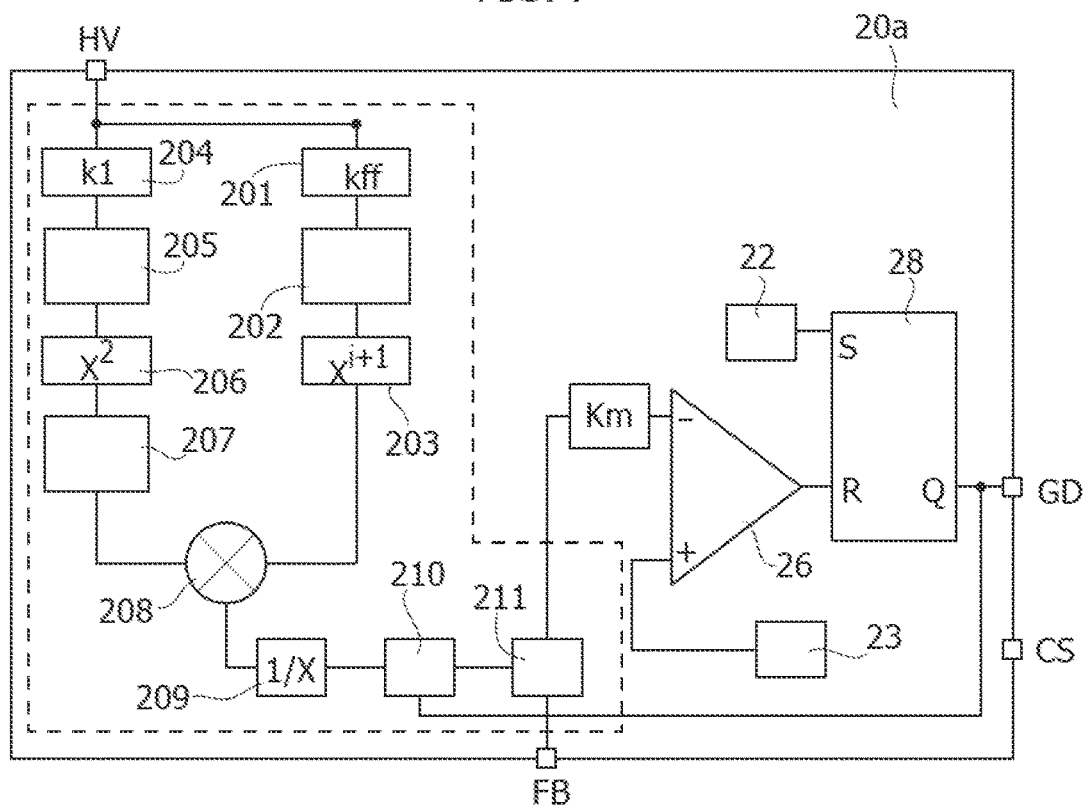
Figure 8:
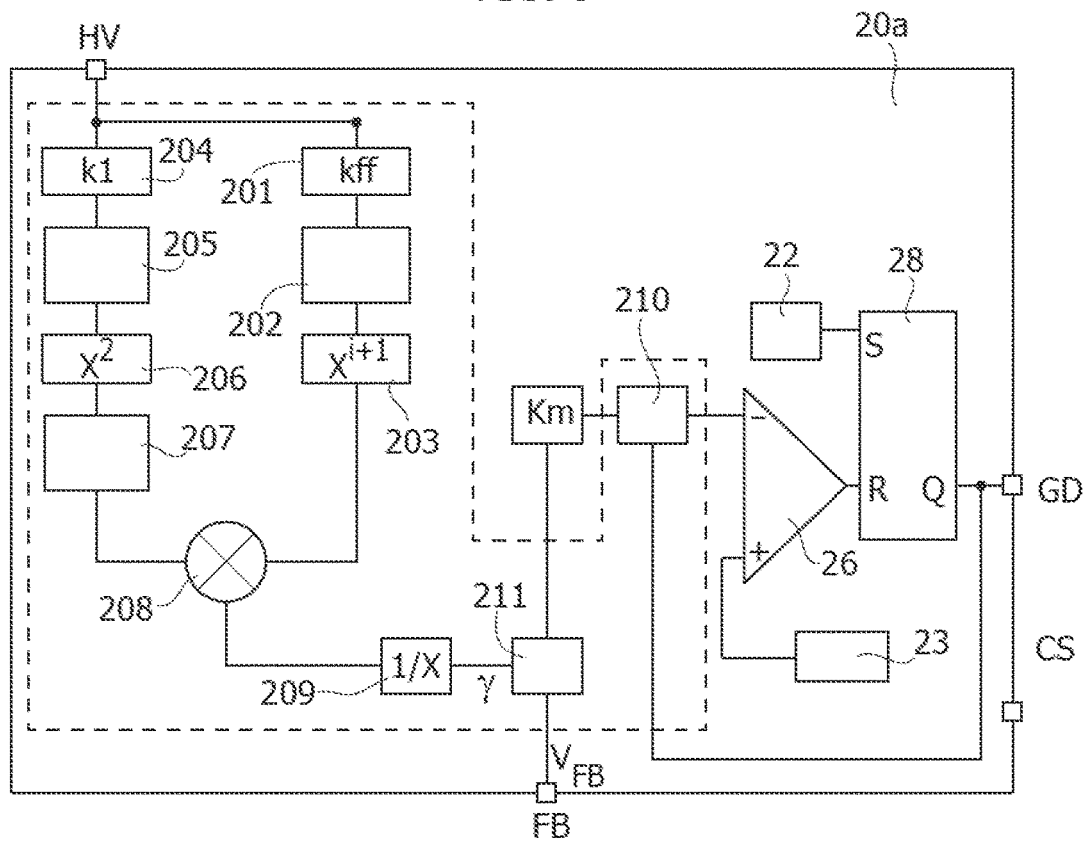

FIGS. 7 and 8 show embodiments in a control circuit 20 configured in the configuration 20*a*. A detailed description of circuit blocks having same reference numerals to those discussed in the foregoing is not repeated here for brevity, as the description of these blocks in the foregoing applies mutatis mutandis to FIGS. 7 and 8.

As exemplified herein, a control circuit (for instance, 20, 20*a*, 20*b*) for controlling a switching stage (for instance, $L_P$, $L_S$, 14) of an electronic converter (for instance, 10) configured to receive an input voltage (for instance, $V_{IN}$) at its input terminals (for instance, 100*a*, 100*b*) and to provide an output voltage (for instance, $V_{OUT}$) at its output terminals (for instance, 102*a*, 102*b*), said switching stage comprising an inductance (for instance, $L_S$, $L_P$), comprises:

one or more first terminals configured to provide one or more respective drive signals (for instance, GD) to one or more electronic switches (for instance, 14) of said switching stage;

a second terminal configured to receive from a feedback circuit (for instance, OC) a first feedback signal (for instance, FB) proportional to said output voltage;

a third terminal configured to receive from a current sensor (for instance, $R_S$) a second feedback signal (for instance, CS) proportional to a current flow in an inductance (for instance, $L_P$) of said switching stage;

a driver circuit (for instance, 28) configured to provide said one or more drive signals as a function of a Pulse-Width Modulation, PWM, signal;

a PWM signal generator circuit (for instance, 26) configured to generate said PWM signal as a function of said first feedback signal, a reference threshold and said second feedback signal or a slope compensation signal (for instance, H), wherein said PWM signal generator circuit comprises a comparator circuit configured to perform a comparison of one of said second feedback signal or a slope compensation signal and said threshold, providing said PWM signal (for instance, VM) as a result of said comparison;

wherein the control circuit comprises processing circuitry (for instance, 201, 202, 203, 204, 205, 206, 207, 208, 209, 210) configured to:

sense (or receive, obtain) an input sensing signal (for instance, HV) in response to said AC input signal being received at said input terminals, provide a first compensation parameter i and providing a first compensating signal (for instance, α) as a function of a power of said input sensing signal equal to an incremented first compensation parameter i+1;

provide a second compensating signal (for instance, β) based on the input sensing signal, the second compensating signal being indicative of a waveform (Γ) of the input sensing signal, provide third compensating signal (for instance, γ) as the inverse of the product of the first compensating signal times the second compensating signal, the third compensating signal indicative of a maximum value for said first feedback signal;

apply duty cycle modulation to the third compensating signal based on said control signal, adjust a maximum power level of the input sensing signal based on the third compensating signal.

As exemplified herein, the control circuit comprises a multiplier circuit block (for instance, 24) coupled to the first terminal to receive the input sensing signal therefrom, and to the processing circuitry to receive the third compensating signal therefrom, the multiplier circuit block having a scaling factor (for instance, Km) and configured to provide a product of the input voltage times the scaling factor times the third compensating signal, obtaining a threshold value (for instance, T) for a power of the input signal.

As exemplified herein, the threshold value for a power of the input signal ($V_{IN}$) is expressed as $$T = \frac{K_m \cdot V_{FBmax}}{2 \cdot K_{ff} \cdot R_S}$$

where $V_{FBamx}$ is me maximum value for said first feedback signal, Km is said scaling factor, Kff is a further scaling factor, $R_S$ is a resistance of said current sensor.

As exemplified herein, the processing circuitry configured to provide said first compensating signal comprises:

a peak detector circuit block (for instance, 201, 202) configured to detect a peak value of the input sensing signal, the peak detector having an adjustable gain block (for instance, 201, Kff) and a holding time interval a power calculator circuit block (for instance, 203) configured to multiply by itself the detected peak value of the input sensing signal α number of times equal to said incremented first compensation parameter i+1.

As exemplified herein, the processing circuitry (configured to provide said second compensating signal comprises:

a normalization processing circuit block (for instance, 204, 205) configured to apply normalization processing to the input sensing signal, providing a normalized signal with unitary amplitude as a result, the normalized signal being indicative of a waveform (for instance, Γ(t)) of the input sensing signal, a power calculator circuit block (for instance, 206) configured to receive the normalized signal and to provide a power spectrum thereof (for instance, $Γ^2(t)$), an integrator circuit block (for instance, 207), preferably a low pass filter, configured to receive the power spectrum of the normalized signal and to apply integration processing thereto, providing an integrated signal over time as a result.

As exemplified herein, the processing circuitry configured to provide said second compensating signal comprises:

a normalization processing circuit block (for instance, 204, 205) configured to apply normalization processing to the input sensing signal, providing a normalized signal with unitary amplitude as a result, the normalized signal being indicative of a waveform (for instance, Γ(t)) of the input sensing signal, a plurality of memory registers (for instance, 207A) configured to store a set of integrated signal values indicative of an integral over time of a square power of at least two different waveforms, a waveform detecting circuit block (for instance, 206A) configured to perform a comparison of a set of parameters of the normalized signal with threshold values, providing a selecting signal as a result of said comparison, wherein each parameter value in said set of parameters is associated with an integrated signal value stored in the plurality of memory registers, and a selecting circuit block (for instance, 207B), preferably a multiplexer, configured to access a memory register in the plurality of memory registers based on the selecting signal obtained, the accessed memory register being associated to the detected waveform of the input sensing signal.

As exemplified herein, the set of parameters of the normalized signal comprises at least one of: a ratio between a peak value and an average value of the normalized signal, (presence of) one or more periodical threshold crossings and time periods between different levels of threshold crossing.

As exemplified herein, the processing circuitry configured to apply duty cycle modulation to the third compensating signal based on said control signal comprises:
  a converter circuit block (for instance, 210a) configured to receive an input voltage signal (for instance, Vx, y) and to convert it to an electrical current signal (for instance, Ix),
  a resistive branch (for instance, 210b, Rd) coupled to a switching circuit (for instance, 210c) configured to be driven to switch based on said output signal,
  a capacitive branch (for instance, 210d) arranged in parallel to the resistive branch to provide an average of said switching voltage as an output signal.

As exemplified herein, an electronic converter (for instance, 10), preferably a flyback converter, comprises:
  a switching stage comprising an inductance (for instance, L) and configured to receive an input voltage at its input terminals and to provide an output voltage at its output terminals, and a control circuit (for instance, 20, 20a, 20b) according to one or more embodiments.

As exemplified herein, a method of controlling a switching stage of an electronic converter comprises driving said switching stage via a control circuit according to one or more embodiments.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection.

A control circuit (20, 20a, 20b) for controlling a switching stage ($L_P$, $L_S$, 14) of an electronic converter (10) configured to receive an input voltage ($V_{IN}$) at its input terminals (100a, 100b) and to provide an output voltage ($V_{OUT}$) at its output terminals (102a, 102b), said switching stage ($L_S$, $L_P$, 14) including an inductance ($L_S$, $L_P$), may be summarized as including: one or more first terminals configured to provide one or more respective drive signals (GD) to one or more electronic switches (14) of said switching stage ($L_S$, $L_P$, 14); a second terminal configured to receive from a feedback circuit (OC) a first feedback signal (FB) proportional to said output voltage ($V_{OUT}$); a third terminal configured to receive from a current sensor (RS) a second feedback signal (CS) proportional to a current flow in an inductance ($L_P$) of said switching stage ($L_P$, $L_S$, 14); a driver circuit (28) configured to provide said one or more drive signals (GD) as a function of a Pulse-Width Modulation, PWM, signal (VM); a PWM signal generator circuit (26) configured to generate said PWM signal as a function of said first feedback signal (FB), a reference threshold (T) and said second feedback signal (CS) or a slope compensation signal (H), wherein said PWM signal generator circuit comprises a comparator circuit (26) configured to perform a comparison of one of said second feedback signal (CS) or a slope compensation signal (H) and said threshold (T), providing said PWM signal (VM) as a result of said comparison; wherein the control circuit (20, 20a, 20b) comprises processing circuitry (201, 202, 203, 204, 205, 206, 207, 208, 209, 210) configured to: sense an input sensing signal (HV) in response to said AC input signal ($V_{IN}$) being received at said input terminals (100a, 100b); provide a first compensation parameter i and providing a first compensating signal (α) as a function of said input sensing signal (HV) elevated to a power equal to an incremented first compensation parameter i+1; provide a second compensating signal (β) based on the input sensing signal (HV), the second compensating signal (β) being indicative of a waveform (Γ) of the input sensing signal (HV); provide third compensating signal (γ) as the inverse of the product of the first compensating signal (α) times the second compensating signal (β), the third compensating signal (γ) indicative of a maximum value for said first feedback signal (FB); apply duty cycle modulation to the third compensating signal (γ) based on said control signal (GD); and adjust a maximum power level of the input sensing signal (HV) based on the third compensating signal (γ).

A multiplier circuit block (24) may be coupled to the first terminal (HV) to receive the input sensing signal therefrom, and to the processing circuitry (201, 202, 203, 204, 205, 206, 207, 208, 209, 210) to receive the third compensating signal (γ) therefrom, the multiplier circuit block (24) having a scaling factor (Km) and configured to provide a product of the input voltage (HV) times the scaling factor (Km) times the third compensating signal (γ), obtaining a threshold value (T) for a power of the input signal ($V_{IN}$).

The threshold value (T) for a power of the input signal ($V_{IN}$) may be expressed as $$T = \frac{K_m \cdot V_{FBmax}}{2 \cdot K_{ff} \cdot R_S}$$

where: $V_{FBamx}$ is the maximum value for said first feedback signal (FB); Km is said scaling factor; Kff is a further scaling factor; RS is a resistance of said current sensor.

The processing circuitry (201, 202, 203, 204, 205, 206, 207, 208, 209, 210) may include: a peak detector circuit block (201, 202) configured to detect a peak value of the input sensing signal (HV), the peak detector having an adjustable gain block (201, Kff) and a holding time interval; and a power calculator circuit block (203) configured to multiply by itself the detected peak value of the input sensing signal (HV) a number of times equal to said incremented first compensation parameter i+1.

The processing circuitry (201, 202, 203, 204, 205, 206, 207, 208, 209, 210) may include: a normalization processing circuit block (204, 205) configured to apply normalization processing to the input sensing signal (HV), providing a normalized signal with unitary amplitude as a result, the normalized signal being indicative of a waveform (Γ(t)) of the input sensing signal (HV); a power calculator circuit block (206) configured to receive the normalized signal and to provide a power spectrum thereof ($Γ^2(t)$); an integrator circuit block (207), preferably a low pass filter, configured to receive the power spectrum of the normalized signal and to apply integration processing thereto, providing an integrated signal over time as a result.

The processing circuitry (201, 202, 203, 204, 205, 206, 207, 208, 209, 210) may include: a normalization processing circuit block (204, 205) configured to apply normalization processing to the input sensing signal (HV), providing a normalized signal with unitary amplitude as a result, the normalized signal being indicative of a waveform (Γ(t)) of the input sensing signal (HV); a plurality of memory registers (207A) configured to store a set of integrated signal values indicative of an integral over time of a square power of at least two different waveforms; a waveform detecting circuit block (206A) configured to perform a comparison of a set of parameters of the normalized signal with threshold values, providing a selecting signal as a result of said comparison, wherein each parameter value in said set of parameters is associated with an integrated signal value stored in the plurality of memory registers (207A); and a selecting circuit block (207B), preferably a multiplexer, configured to access a memory register in the plurality of memory registers (207A) based on the selecting signal obtained, the accessed memory register being associated to the detected waveform of the input sensing signal (HV).

The set of parameters of the normalized signal may include at least one of: a ratio between a peak value and an average value of the normalized signal; one or more periodical threshold crossings; and time periods between different levels of threshold crossing.

The processing circuitry (201, 202, 203, 204, 205, 206, 207, 208, 209, 210) may include: a converter circuit block (210a) configured to receive an input voltage signal (Vx, y) and to convert it to an electrical current signal (Ix); a resistive branch (210b, Rd) coupled to a switching circuit (210c) configured to be driven to switch based on said output signal (GD); a capacitive branch (210d) arranged in parallel to the resistive branch (210b) to provide an average of said switching voltage as an output signal.

An electronic converter (10), preferably a flyback converter, may be summarized as including: a switching stage (L$_S$, L$_P$, 14) including an inductance (L) and configured to receive an input voltage (V$_{IN}$) at its input terminals (100a, 100b) and to provide an output voltage (V$_{OUT}$) at its output terminals (102a, 102b); and a control circuit (20, 20a, 20b) coupled to said switching stage (L$_S$, L$_P$, 14).

A method of controlling a switching stage (L$_P$, L$_S$, 14) of an electronic converter (10), the method may be summarized as including driving said switching stage (L$_P$, L$_S$, 14) via a control circuit (20, 20a, 20b).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for controlling a switching stage of an electronic converter configured to receive an input voltage at input terminals of the electronic converter and to provide an output voltage at output terminals of the electronic converter, the switching stage including an inductance, the control circuit comprising:

a first terminal configured to provide a drive signal to an electronic switch of said switching stage;
a second terminal configured to receive from a feedback circuit a first feedback signal proportional to said output voltage;
a third terminal configured to receive from a current sensor a second feedback signal proportional to a current flow in an inductance of said switching stage;
a driver circuit configured to provide said drive signal as a function of a Pulse-Width Modulation (PWM) signal; and
a PWM signal generator circuit configured to generate said PWM signal as a function of said first feedback signal, a reference threshold and said second feedback signal or a slope compensation signal,
wherein the control circuit includes processing circuitry configured to:
sense an input sensing signal in response to said input voltage being received at said input terminals; and
provide a first compensation parameter and provide a first compensating signal as a function of said input sensing signal elevated to a power equal to an incremented first compensation parameter.

2. The control circuit of claim 1, wherein said PWM signal generator circuit includes a comparator circuit configured to perform a comparison of one of said second feedback signal or the slope compensation signal and said threshold, and the PWM signal generator circuit is configured to generate said PWM signal based on said comparison.

3. The control circuit of claim 1, wherein the processing circuitry is configured to:
provide a second compensating signal based on the input sensing signal, the second compensating signal being indicative of a waveform of the input sensing signal;
provide a third compensating signal as an inverse of a product of the first compensating signal times the second compensating signal, the third compensating signal indicative of a maximum value for said first feedback signal;
apply duty cycle modulation to the third compensating signal based on said control signal; and
adjust a maximum power level of the input sensing signal based on the third compensating signal.

4. The control circuit of claim 3, comprising a multiplier circuit block configured to receive the input sensing signal, and coupled to the processing circuitry and configured to receive the third compensating signal therefrom, the multiplier circuit block having a scaling factor and configured to provide a product of the input voltage times the scaling factor times the third compensating signal, obtaining a threshold value for a power of the input signal.

5. The control circuit of claim 4, wherein the threshold value for a power of the input signal is expressed as $$T = \frac{K_m \cdot V_{FBmax}}{2 \cdot K_{ff} \cdot R_S}$$

where:
VFBamx is the maximum value for said first feedback signal;
Km is said scaling factor;
Kff is a further scaling factor;
RS is a resistance of said current sensor.

6. The control circuit of claim 1, wherein the processing circuitry comprises:

a peak detector circuit block configured to detect a peak value of the input sensing signal, the peak detector having an adjustable gain block and a holding time interval; and a power calculator circuit block configured to multiply by itself the detected peak value of the input sensing signal a number of times equal to said incremented first compensation parameter.

7. The control circuit of claim 1, wherein the processing circuitry comprises:

a normalization processing circuit block configured to apply normalization processing to the input sensing signal, providing a normalized signal with unitary amplitude as a result, the normalized signal being indicative of a waveform of the input sensing signal;

a power calculator circuit block configured to receive the normalized signal and to provide a power spectrum thereof; and an integrator circuit block configured to receive the power spectrum of the normalized signal and to apply integration processing thereto, providing an integrated signal over time as a result.

8. The control circuit of claim 7, wherein the integrator circuit block includes a low pass filter.

9. The control circuit of claim 1, wherein the processing circuitry comprises:

a normalization processing circuit block configured to apply normalization processing to the input sensing signal, providing a normalized signal with unitary amplitude as a result, the normalized signal being indicative of a waveform of the input sensing signal;

a plurality of memory registers configured to store a set of integrated signal values indicative of an integral over time of a square power of at least two different waveforms;

a waveform detecting circuit block configured to perform a comparison of a set of parameters of the normalized signal with threshold values, providing a selecting signal as a result of said comparison, wherein each parameter value in said set of parameters is associated with an integrated signal value stored in the plurality of memory registers; and a selecting circuit block configured to access a memory register in the plurality of memory registers based on the selecting signal obtained, the accessed memory register being associated to the detected waveform of the input sensing signal.

10. The control circuit of claim 9, wherein the selecting circuit block includes a multiplexer.

11. The control circuit of claim 9, wherein the set of parameters of the normalized signal comprises at least one of:

a ratio between a peak value and an average value of the normalized signal;

one or more periodical threshold crossings; and time periods between different levels of threshold crossing.

12. The control circuit of claim 1, wherein the processing circuitry comprises:

a converter circuit block configured to receive an input voltage signal and to convert it to an electrical current signal;

a resistive branch coupled to a switching circuit configured to be driven to switch based on said output signal; and a capacitive branch arranged in parallel to the resistive branch to provide an average of said switching voltage as an output signal.

13. An electronic converter, comprising:

input terminals configured to receive an input voltage;

output terminals configured to provide an output voltage;

a switching stage comprising an inductance; and a control circuit coupled to said switching stage, the control circuit including:

a first terminal configured to provide a drive signal to an electronic switch of said switching stage;

a second terminal configured to receive from a feedback circuit a first feedback signal proportional to said output voltage;

a third terminal configured to receive from a current sensor a second feedback signal proportional to a current flow in an inductance of said switching stage;

a driver circuit configured to provide said drive signal as a function of a Pulse-Width Modulation (PWM) signal; and a PWM signal generator circuit configured to generate said PWM signal as a function of said first feedback signal, a reference threshold and said second feedback signal or a slope compensation signal, wherein the control circuit includes processing circuitry configured to:

sense an input sensing signal in response to said input voltage being received at said input terminals; and provide a first compensation parameter and provide a first compensating signal as a function of said input sensing signal elevated to a power equal to an incremented first compensation parameter.

14. The electronic converter of claim 13, wherein said PWM signal generator circuit includes a comparator circuit configured to perform a comparison of one of said second feedback signal or the slope compensation signal and said threshold, and the PWM signal generator circuit is configured to generate said PWM signal based on said comparison.

15. The electronic converter of claim 14, wherein the processing circuitry is configured to:

provide a second compensating signal based on the input sensing signal, the second compensating signal being indicative of a waveform of the input sensing signal;

provide a third compensating signal as an inverse of a product of the first compensating signal times the second compensating signal, the third compensating signal indicative of a maximum value for said first feedback signal;

apply duty cycle modulation to the third compensating signal based on said control signal; and adjust a maximum power level of the input sensing signal based on the third compensating signal.

16. The electronic converter of claim 15, wherein the control circuit further includes a multiplier circuit block configured to receive the input sensing signal, and coupled to the processing circuitry and configured to receive the third compensating signal therefrom, the multiplier circuit block having a scaling factor and configured to provide a product of the input voltage times the scaling factor times the third compensating signal, obtaining a threshold value for a power of the input signal.

17. A method of controlling a switching stage of an electronic converter, the electronic converter having input terminals configured to receive an input voltage and output terminals configured to provide an output voltage, the switching stage including an inductance, the method comprising:

provideproviding, at a first terminal of a control circuit, a drive signal to an electronic switch of said switching stage;

receiving, at a second terminal of the control circuit, a first feedback signal proportional to said output voltage;

receiving, at a third terminal of the control circuit, a second feedback signal proportional to a current flow in an inductance of said switching stage;

providing, by a driver circuit of the control circuit, said drive signal as a function of a Pulse-Width Modulation (PWM) signal; and generating, by a PWM signal generator circuit of the control circuit, said PWM signal as a function of said first feedback signal, a reference threshold and said second feedback signal or a slope compensation signal;

sensing, by processing circuitry of the control circuit, an input sensing signal in response to said input voltage being received at said input terminals; and providing, by the processing circuitry, a first compensation parameter and a first compensating signal as a function of said input sensing signal elevated to a power equal to an incremented first compensation parameter.

18. The method of claim 17, wherein generating the PWM signal includes performing a comparison, by a comparator circuit, of one of said second feedback signal or the slope compensation signal and said threshold, and the PWM signal generator circuit is configured to generate said PWM signal based on said comparison.

19. The method of claim 17, further comprising:

providing, by the processing circuitry, a second compensating signal based on the input sensing signal, the second compensating signal being indicative of a waveform of the input sensing signal;

providing, by the processing circuitry, a third compensating signal as an inverse of a product of the first compensating signal times the second compensating signal, the third compensating signal indicative of a maximum value for said first feedback signal;

applying, by the processing circuitry, duty cycle modulation to the third compensating signal based on said control signal; and adjusting, by the processing circuitry, a maximum power level of the input sensing signal based on the third compensating signal.

20. The method of claim 19, further comprising:

receiving, by a multiplier circuit block of the control circuit, the input sensing signal and the third compensating signal; and providing, by the multiplier circuit block, a threshold value for a power of the input as a product of the input voltage times a scaling factor times the third compensating signal.

* * * * *